(12) United States Patent
Gandon-Pain et al.

(10) Patent No.: US 8,883,929 B2
(45) Date of Patent: *Nov. 11, 2014

(54) FUNCTIONALIZED VINYL POLYMER NANOPARTICLES

(75) Inventors: Sylvie Gandon-Pain, Clermont-Ferrand (FR); Alain Hut, Le Cendre (FR)

(73) Assignees: Compagnie Generale des Etablissements, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/446,545

(22) Filed: Apr. 13, 2012

(65) Prior Publication Data
US 2012/0208948 A1 Aug. 16, 2012

Related U.S. Application Data

(62) Division of application No. 12/309,081, filed as application No. PCT/EP2007/005771 on Jun. 29, 2007, now abandoned.

(30) Foreign Application Priority Data

Jul. 6, 2006 (FR) ...................... 06 06168

(51) Int. Cl.
*C08J 3/22* (2006.01)
*C08F 212/14* (2006.01)

(52) U.S. Cl.
CPC . *C08J 3/22* (2013.01); *C08F 212/14* (2013.01)
USPC ........ 525/326.5; 525/209; 525/92 G; 524/521

(58) Field of Classification Search
CPC ........ C08J 3/22; C08F 212/14; C08F 212/36; C08F 220/10
USPC ....................... 525/326.5, 209, 92 G; 524/521
See application file for complete search history.

(56) References Cited

U.S. PATENT DOCUMENTS

| | | | | |
|---|---|---|---|---|
| 5,364,901 A * | 11/1994 | Nield et al. | ................. | 524/521 |
| 6,420,441 B1 | 7/2002 | Allen et al. | | |
| 6,653,042 B1 | 11/2003 | Fukino et al. | | |
| 2001/0036592 A1 | 11/2001 | Hoshi et al. | | |
| 2003/0125467 A1 * | 7/2003 | Akema et al. | ................. | 525/208 |
| 2005/0228134 A1 * | 10/2005 | Xie et al. | ................. | 525/80 |
| 2009/0270558 A1 | 10/2009 | Gandon-Pain et al. | | |
| 2010/0022714 A1 * | 1/2010 | Varagniat et al. | ................. | 525/209 |

FOREIGN PATENT DOCUMENTS

| | | |
|---|---|---|
| EP | 1 475 232 A1 | 11/2004 |
| WO | WO 2006/069792 A1 | 7/2006 |

OTHER PUBLICATIONS

Etlink et al., "Performance limits of monolithic and packed capillary columns in high-performance liquid chromatography and capillary electrochromatography," Journal of Chromatography A., Nov. 4, 2006, p. 256-262, Elsevier.
Berriot et al., "Reinforcement of model filled elastomers: experimental and theoretical approach of swelling properties," Polymer 43 (2002), pp. 6131-6138, Elsevier.
International Search Report of International Application No. PCT/EP2007/005771 mailed Nov. 22, 2007.

* cited by examiner

*Primary Examiner* — Mark Kaucher
(74) *Attorney, Agent, or Firm* — Dickinson Wright PLLC

(57) ABSTRACT

Nanoparticles of functionalized, cross-linked vinyl polymer, usable as reinforcing filler in a polymeric matrix. The vinyl polymer is a copolymer of at least the following monomers, which are all copolymerizable by free-radical polymerization: a non-aromatic vinyl monomer "A"; a monomer "B" bearing a function Z of formula $\equiv$Si—X, where X represents a hydroxyl or hydrolysable group; and a cross-linking monomer "C" which is at least bifunctional from the point of view of the polymerization. The vinyl polymer is preferably a polymethacrylate, in particular a copolymer of methyl methacrylate (monomer A), trimethoxysilylpropyl methacrylate (monomer B) and ethylene glycol dimethacrylate (monomer C), being in the form of nanobeads the diameter of which is of between 10 and 100 nm.

11 Claims, 1 Drawing Sheet

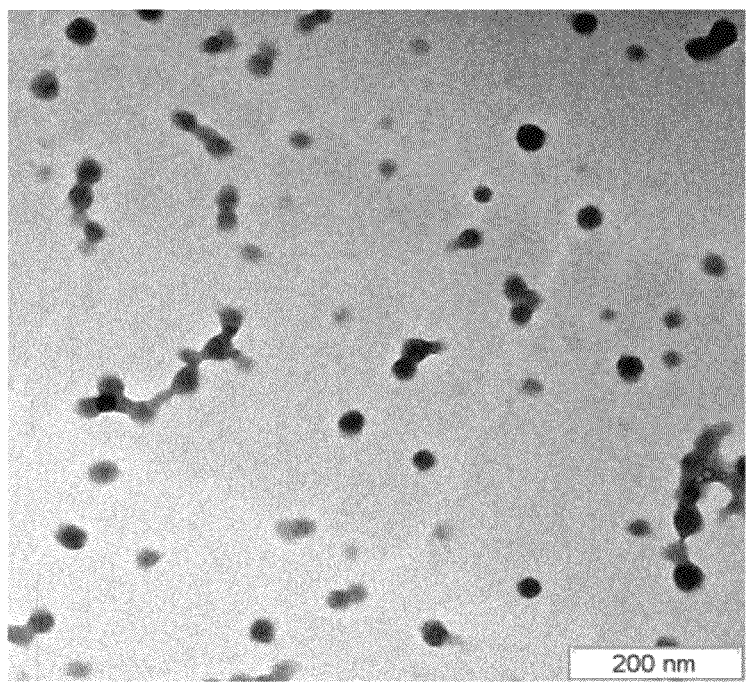

FUNCTIONALIZED VINYL POLYMER NANOPARTICLES

BACKGROUND

The present invention relates to reinforcing fillers capable of reinforcing polymeric matrices or compositions, more particularly to reinforcing fillers of organic type and to their use for reinforcing such matrices, in particular elastomeric matrices involved in the manufacture of tyres for automobiles.

So as to reduce fuel consumption and the pollution emitted by motor vehicles, major attempts have been made by tyre designers to obtain tyres having all of the following: very low rolling resistance, improved adhesion both on dry ground and on wet or snow-covered ground, and good wear resistance. One effective solution to this problem has been found, over the last fifteen years, owing to the development of new truly reinforcing fillers of inorganic type, also known as "non-black fillers", very particularly highly dispersible silicas ("HD" silicas), which have proved capable of replacing conventional carbon blacks for tyres in their reinforcing filler function.

However, these reinforcing inorganic fillers, due to having a slightly greater density for an equivalent reinforcing ability, have the known drawback of increasing the weight of the polymeric matrices which they reinforce, compared with the use of carbon black, which rather rules out another, more general, object, which is to reduce the weight of the tyres and therefore of the vehicles comprising them.

In continuing their research, the Applicants have discovered certain synthetic organic fillers which, unexpectedly, can be used as true reinforcing fillers, that is to say are capable of replacing conventional carbon blacks for tyres just like HD silicas.

These novel synthetic organic fillers, due to having a density which is approximately half as much, make it possible very significantly to reduce the weight of the polymeric matrices which they reinforce and that of the polymer articles containing them, in particular rubber articles such as tyres, without compromise on the use properties of these articles.

SUMMARY OF DISCLOSURE

Consequently, a first subject of the invention relates to nanoparticles of functionalised, cross-linked vinyl polymer, usable in particular as reinforcing filler in a polymeric matrix, characterised in that said vinyl polymer is a copolymer of at least the following monomers, which are all copolymerisable by free-radical polymerisation:
 a non-aromatic vinyl monomer "A":
 a monomer "B" bearing a function Z of formula =Si—X, X representing a hydroxyl or hydrolysable group;
 a cross-linking monomer "C", that is to say one which is at least bifunctional from the point of view of said polymerisation.

The subject of the invention is also the use of nanoparticles according to the invention for reinforcing a polymeric, in particular elastomeric, matrix.

A particular subject of the invention is the use of nanoparticles according to the invention for reinforcing finished articles or semi-finished products made of rubber, these articles or semi-finished products being in particular intended for any ground contact system for automobiles, such as tyres, internal safety supports for tyres, wheels, rubber springs, elastomeric joints and other suspension and anti-vibration elements.

The subject of the invention is very particularly the use of nanoparticles according to the invention for reinforcing tyres.

The subject of the invention is also a masterbatch comprising nanoparticles according to the invention, embedded in a polymeric, in particular elastomeric, matrix.

The subject of the invention is also a polymeric composition comprising at least one polymer, in particular elastomer, nanoparticles according to the invention and a coupling agent providing the bond between the polymer and the surface of the nanoparticles.

The invention and its advantages will be readily understood in the light of the description and the examples of embodiment which follow, and also from the FIGURE, which is an electron microscopy (TEM) image taken of a sample of VP nanoparticles in aqueous emulsion, in accordance with the invention (FIG. 1).

Measurements and Tests Used

1. Characterisation of the Polyvinyl Filler

The filler of vinyl polymer (abbreviated to "VP") described below consists of "nanoparticles", that is to say particles the principal dimension of which (diameter or length) is typically less than one micrometer, generally within a range of the order of about ten nanometers to one or several hundreds of nanometers.

These VP nanoparticles are in the form of elementary particles (or "primary particles"), these elementary particles or nanoparticles possibly forming aggregates (or "secondary particles") of at least two of these nanoparticles, said nanoparticles and/or aggregates possibly in turn forming agglomerates capable of disagglomerating into these nanoparticles and/or aggregates under the effect of an external force, for example under the action of mechanical working.

These nanoparticles are characterised using a transmission electron microscope (TEM), as indicated below.

A) Characterisation in an Emulsion (Latex):

The VP filler latex, diluted beforehand with water (for example 8 g of filler per liter of water) is diluted to approximately 50 times its volume in isopropanol. 40 ml of the solution thus obtained is poured into a tall-form beaker (50 ml), then dispersed using a 600 W ultrasound probe (Vibracell probe, reference 72412, sold by Bioblock Scientific), at a power of 100%, for 8 min. in pulse mode (1 sec ON/1 sec OFF). A drop of the solution thus obtained is then placed on a copper microscope grid with a carbon membrane, then observed under a TEM ("CM 200" sold by FEI, acceleration voltage 200 kV) equipped with a camera (MegaView II camera sold by Soft Imaging System) and an image analysis system (AnalySIS Pro A version 3.0 from Soft Imaging System).

The settings of the TEM are optimised in known manner, according to the sample and the state of ageing of the filament (typically, condenser diaphragm 2 (50 µm diameter)—lens 3 (40 µm diameter)). The magnification of the microscope is adapted so as to have sufficient resolution on the nanoparticles. For example, a magnification of 65,000 corresponds to a resolution close to 0.96 nm/pixel, on a digital image of 1248×1024 pixels; such a resolution permits, for example, definition of a spherical nanoparticle of 40 nm diameter with more than 1000 pixels. The camera is calibrated conventionally using standards (at low magnification, a gold grid of 2160 lines/mm; at high magnification, gold beads of a diameter of 0.235 nm).

The diameter of the nanoparticles is measured using the software AnalySIS Pro A version 3.0 (with "Circle" option of the "Measurement" menu). For each image and for a given nanoparticle, the operator shows on the screen (using the mouse) three points located on the periphery of the image of the nanoparticle. The software then automatically traces the circle passing through these three points and stores the values of the circular area, the circular perimeter and the circular diameter of the nanoparticle in a file (Excel). As this operation is possible only for nanoparticles having well-defined contours, nanoparticles present in agglomerates are excluded from the measurement. The test is repeated on at least 2000 nanoparticles representative of the sample (from at least 10 different images, typically 50).

B) Characterisation in a Rubber Composition:

The samples of VP filler in vulcanised rubber composition are prepared in known manner by ultracryomicrotomy (see for example L. Sawyer and D. Grubb, *Polymer Microscopy*, p. 92, Chapman and Hall).

The apparatus used here is a Leica ultracryomicrotome ("EMFCS") equipped with a diamond knife. The sample is cut in the form of a truncated pyramid with rectangular base, the truncated face from which the sections will be taken having a side length of less than 600 μm. This truncated pyramid is held firmly during cutting. The sample is cooled to a suitable temperature (close to the glass transition temperature of the sample) so that it is sufficiently hard to permit cutting, the temperature of the knife being typically close to that of the sample. The speed and thickness of cut (as displayed by the equipment) are preferably between 1 and 2 mm/sec and between 20 and 30 nm, respectively. Using a drop of aqueous sucrose solution (40 g in 40 ml of water), the sections are recovered from the enclosure of the ultracryomicrotome, then placed on a TEM grid, at ambient temperature. The sucrose is then eliminated by placing the grid on the surface of a crystalliser filled with distilled water.

To increase the contrast, the sections may be subjected to a step of staining with osmium tetroxide ($OsO_4$), using a process well-known to the person skilled in the art (L. C. Sawyer and David Grubb, Polymer Microscopy, Chapman and Hall, London, New York, 1987, pp. 97-98): the grids are placed above an open crystalliser containing a mix of 20 ml distilled water and 0.1 g of $OsO_4$ (Agar Scientific, reference R1015); the whole, placed in an airtight desiccator, is heated in a water bath to 50° C. for 3 to 3½ hours.

The sections are observed using a CM 200 microscope (voltage 200 kV). To optimise the contrast, the observations are performed by conventional energy-filtered imaging (energy window ΔE equal to approximately 15 eV), with a GIF (Gatan Imaging Filter) imaging system and the associated software (Filter Control and Digital Micrograph 3.4).

PREFERRED EMBODIMENTS OF DETAILED DESCRIPTION OF THE INVENTION

In the present description, unless expressly indicated otherwise, all the percentages (%) indicated are mass %.

1. Nanoparticles of Vinyl Polymer

The nanoparticles of the invention have the essential characteristic of being formed of a functionalised, cross-linked vinyl polymer, said vinyl polymer (abbreviated to "VP") being a copolymer of at least the following monomers, all copolymerisable by free-radical polymerisation:

a non-aromatic vinyl monomer "A":
a monomer "B" bearing a function Z of Formula (I):

≡Si—X, in which X represents a hydroxyl group or a hydrolysable monovalent group;
a cross-linking monomer "C", that is to say one which is at least bifunctional from the point of view of said polymerisation.

In the present application, the following are understood to mean by definition:
"vinyl monomer", any monomer bearing at least one vinyl group ($CH_2$=CH—) or (substituted form) vinylidene group ($CH_2$=C<);
"non-aromatic vinyl monomer", any vinyl monomer other than a monomer of vinyl aromatic type, that is to say alpha-substituted by an aromatic group.

Preferably, the VP above is a copolymer the monomers of which are exclusively vinyl ones or the majority weight fraction of the monomers of which (preferably equal to or greater than 50%, more preferably equal to or greater than 70%) is constituted of vinyl monomers (the minority fraction possibly resulting from one or more monomer(s) other than vinyl ones).

These definitions being given, the person skilled in the art will immediately understand that the monomer C, in order to be able to cross-link the VP, must be at least bifunctional, that is to say bear at least two functions which are polymerisable by free-radical polymerisation, unlike the monomers A and B which, from the point of view of the polymerisation, must be at least monofunctional, that is to say bear at least one function which is polymerisable by free-radical polymerisation.

However, the present invention is not limited to the cases of monomers A and B which are monofunctional from the point of view of the polymerisation, each of them possibly comprising more than one function which is polymerisable by free-radical polymerisation. Thus, in the specific case of a bifunctional monomer A or monomer B (as is the case, for example, for the di(meth)acrylates or di(meth)acrylamides described later), the latter might possibly also, according to one particular embodiment of the invention, fulfil the cross-linking function of the monomer C.

The Z functionalisation of the VP is provided by the monomer B. The molar ratio of this monomer B is preferably greater than 5%, in particular between 5 and 30%, in particular between 5 and 20%.

The person skilled in the art will readily understand from reading Formula (I) above that there is at least one and at most three X or hydroxyl group(s) or hydrolysable monovalent group(s), joined to the VP via the tetravalent silicon atom.

Preferably, X is a halogen, in particular chlorine, or X satisfies the formula OR in which O is oxygen and R represents hydrogen or a straight-chain or branched monovalent hydrocarbon group, comprising preferably from 1 to 15 carbon atoms.

Z functions selected from the so-called "hydroxysilyl" (≡Si—OH) or "alkoxysilyl" (≡Si—OR') functions are more particularly suitable, R' being a monovalent hydrocarbon radical preferably comprising from 1 to 15 carbon atoms, more preferably selected from among alkyls, alkoxyalkyls, cycloalkyls and aryls, in particular from among $C_1$-$C_8$ alkyls, $C_2$-$C_8$ alkoxyalkyls, $C_5$-$C_{10}$ cycloalkyls and $C_6$-$C_{12}$ aryls.

According to one particular preferred embodiment of the invention, Z corresponds to one of the formulae below:

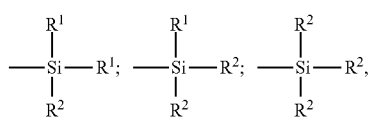

in which:
the radicals $R^1$, which may or may not be substituted, and may be identical or different, are selected from the group consisting of $C_1$-$C_8$ alkyls, $C_5$-$C_8$ cycloalkyls and $C_6$-$C_{12}$ aryls;

the radicals $R^2$, which may or may not be substituted, and which may be identical or different, are selected from the group consisting of hydroxyl, $C_1$-$C_8$ alkoxyls and $C_5$-$C_8$ cycloalkoxyls.

More preferably, in these relationships:

the radicals $R^1$ are selected from the group consisting of $C_1$-$C_4$ alkyls, cyclohexyl and phenyl, in particular from among $C_1$-$C_4$ alkyls, more particularly from among methyl and ethyl;

the radicals $R^2$ are selected from the group consisting of hydroxyl and $C_1$-$C_6$ alkoxyls, in particular from among hydroxyl and $C_1$-$C_4$ alkoxyls, more particularly from among hydroxyl, methoxyl and ethoxyl.

More preferably still, the radicals $R^1$ are selected from among methyl and ethyl and the radicals $R^2$ are selected from among hydroxyl, methoxyl and ethoxyl.

According to a first preferred embodiment, the comonomer B is selected from the group consisting of hydroxysilyl-($C_1$-$C_4$) alkyl acrylates and methacrylates, ($C_1$-$C_4$) alkoxysilyl-($C_1$-$C_4$) alkyl acrylates and methacrylates, and mixes of such monomers. More preferably, it is selected from the group consisting of hydroxy-, methoxy-, ethoxysilyl-($C_1$-$C_4$) alkyl acrylates and methacrylates and mixes of such monomers, in particular from among hydroxy-, methoxy-, ethoxy-silylpropyl acrylates and methacrylates, more particularly from among trimethoxysilylpropyl acrylate and methacrylate.

According to a second preferred embodiment, the comonomer B is selected from the group consisting of styryl-($C_1$-$C_4$) alkyl-hydroxysilanes, styryl-($C_1$-$C_4$) alkyl-($C_1$-$C_4$) alkoxysilanes and mixes of such monomers. More preferably, it is selected from the group consisting of styryl-($C_1$-$C_4$) alkyl hydroxy-, methoxy-, ethoxy-silanes and mixes of such monomers, in particular from among styrylethylhydroxysilanes, styrylethylmethoxysilanes and styrylethylethoxysilanes; more particularly styrylethyltrimethoxysilane (or trimethoxysilylethylstyrene) is used.

Taking into account the preferred molar ratios indicated above for this comonomer B bearing the function Z, the latter is used in a weight ratio which is preferably greater than 10%, more preferably of between 10 and 30%, in particular between 15 and 30%.

The comonomers of type B are well-known, in particular those selected from the group consisting of trimethoxysilylpropyl methacrylate (abbreviated to "TSPM"), trimethoxysilylpropyl acrylate (or "TSPA") and trimethoxysilylethylstyrene (or "TSES") or styrylethyltrimethoxysilane, of the respective formulae below:

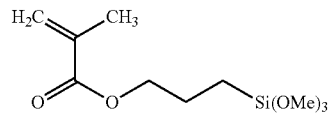

Trimethoxysilylpropyl methacrylate ("TSPM" or "MPS")

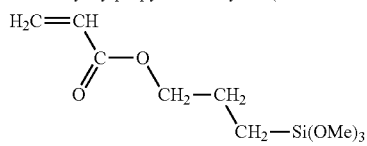

Trimethoxysilylpropyl acrylate ("TSPA" or "APS")

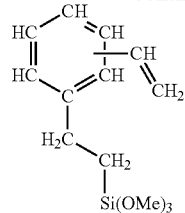

Trimethoxysilylethylethylstyrene ("TSES")

With regard now to the non-aromatic vinyl monomer A, the latter preferably corresponds to Formula (II):

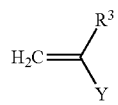

in which:
the radical $R^3$ is selected from the group consisting of hydrogen, $C_1$-$C_8$ alkyls and $C_5$-$C_8$ cycloalkyls;
the radical Y is selected from the group consisting of halogens, the radicals OH, OR', SR', C≡N, C(O)OH, C(O)OR', C(O)N(R'R"), C(O)R' and OC(O)R' in which R' and R", which may be identical or different, are selected from the group consisting of linear, branched or cyclic alkyls, comprising from 1 to 12 carbon atoms, and aryls, aralkyls or alkaryls comprising from 6 to 20 carbon atoms, R' and R" possibly comprising at least one heteroatom selected from among halogens (preferably chlorine), oxygen, nitrogen and sulphur.

The following monomers may be mentioned by way of examples of such monomers A:

vinyl alcohol (for the hydroxyl radical Y=OH);

methyl vinyl ether, ethyl vinyl ether, phenyl vinyl ether (for the organoxyl radical Y=OR');

methyl vinyl thioether, ethyl vinyl thioether, phenyl vinyl thioether (for the sulphenyl radical Y=SW);

acrylonitrile and methacrylonitrile (for the cyano radical Y=C≡N);

acrylic acid and methacrylic acid (for the carboxyl radical Y=C(O)OH);

methyl, n-butyl, tert. butyl, hydroxyethyl, glycidyl(meth) acrylates (for the oxycarbonyl radical Y=C(O)OR');

N,N-dimethyl-(meth)acrylamide, N,N-diisopropyl-(meth) acrylamide, N-methyl-N-isopropylacrylamide (for the carbamoyl radical Y=C(O)N(R'R");

vinyl methyl ketone (for the acyl radical Y=C(O)R');

vinyl acetate, vinyl propanoate (for the acyloxy radical Y=OC(O)R').

Preferably, in Formula (II) above, the following characteristics are satisfied:
$R^3$ is selected from the group consisting of hydrogen and $C_1$-$C_6$ alkyls;
Y is selected from the group consisting of chlorine, the radicals C(O)OH, C(O)OR', C(O)N(R'R") and OC(O)R'.

More preferably still, the following characteristics are satisfied:
Y is the group C(O)OR';
$R^3$ is hydrogen or methyl.

By way of examples of monomers A which satisfy the more preferable characteristics above, mention will be made particularly of the acrylate or methacrylate monomers of Formula (II) in which Y is C(O)OR' and R' is selected from the group consisting of alkyls having from 1 to 8 carbon atoms.

By way of examples of monomers A which satisfy the preferred characteristics above, mention will be made particularly of acrylate ($R^3$=hydrogen) or methacrylate ($R^3$=methyl) monomers in which R' is an alkyl comprising from 1 to 4 carbon atoms, in particular those selected from the group consisting of methyl acrylate (R' is methyl), methyl methacrylate (R' is methyl), ethyl acrylate (R' is ethyl), ethyl methacrylate (R' is ethyl), n-butyl acrylate (R' is n-butyl), n-butyl methacrylate (R' is n-butyl), tert. butyl acrylate (R' is tert. butyl), tert. butyl methacrylate (R' is tert. butyl), hydroxyethyl acrylate (R' is hydroxyethyl), hydroxyethyl methacrylate (R' is hydroxyethyl), and mixes of these compounds.

For clarity of the explanation, the structural formulae of some of these preferred monomers A of monofunctional type are recalled below:

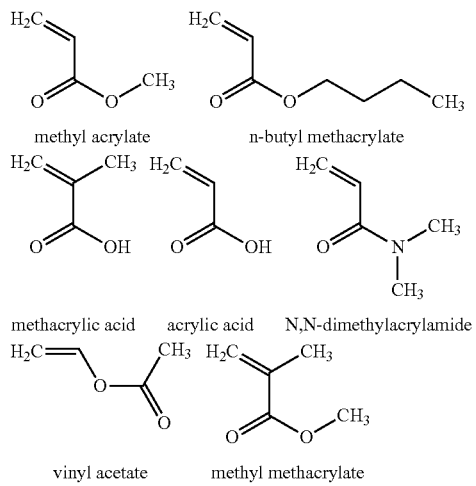

Preferably methyl acrylate or methyl methacrylate, more preferably still methyl methacrylate (abbreviated to "MMA"), is used.

By way of examples of monomers A of bifunctional type, there could be used monomers of Formula (II) above in which the radical Y bears a second vinyl or vinylidene group which is copolymerisable by free-radical polymerisation.

The Z-functionalised VP is furthermore present in a cross-linked state, that is to say in a three-dimensional form, so as maintain the morphology of the filler properly at high temperature.

The cross-linking is provided by at least one starting comonomer (monomer C) which is polymerisable by addition reaction and is bifunctional from the point of view of the polymerisation, that is to say bears at least one second function capable of creating a three-dimensional VP network upon polymerisation. This monomer C, termed "cross-linking", may be a vinyl or non-vinyl, aromatic or aliphatic monomer.

More preferably suitable as comonomer C are comonomers bearing two unsaturated groups, in particular ethylene groups, polymerisable by free-radical polymerisation, in particular those selected from the group consisting of di(meth) acrylates or tri(meth)acrylates of polyols, in particular of diols or of triols (for example of ethylene glycol, propylene glycol, 1,4-butanediol, 1,6-hexanediol, trimethylolpropane), alkylene di(meth)acrylamides (for example methylene bisacrylamide), vinyl aromatic compounds, preferably styrene ones, bearing at least two vinyl groups (for example diisopropenylbenzene (DIB), divinylbenzene (DVB), trivinylbenzene (TVB)), and mixes of such comonomers.

The structural formulae of some of these examples of preferred monomers C will be recalled below:

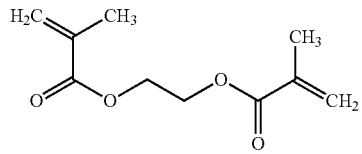

Ethylene glycol dimethacrylate (abbreviated to "EGDMA")

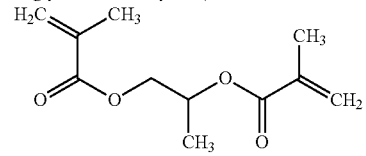

Propylene glycol dimethacrylate (abbreviated to "PGDMA")

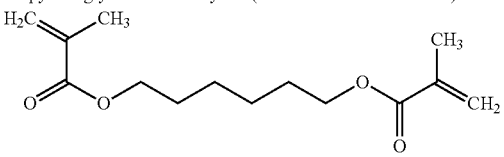

Hexamethylene glycol dimethacrylate (abbreviated to "HGDMA")

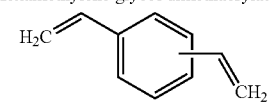

Divinylbenzene (abbreviated to "DVB")

According to one particularly preferred embodiment, the VP of the nanoparticles of the invention is a polyacrylate or polymethacrylate, or a copolymer resulting from (meth)acrylate units in a majority weight fraction (preferably at least equal to or greater than 50%, more preferably equal to or greater than 70%), for example a copolymer selected from the group consisting of the copolymers MMA-TSPM-EGDMA, MMA-TSPM-PGDMA, MMA-TSPM-HGDMA and MMA-TSPM-DVB.

The comonomer B bearing the aforementioned function Z or the comonomer A could be also used as cross-linking comonomer, provided of course that this comonomer B or this comonomer A is itself at least bifunctional and copolymerisable by free-radical polymerisation with the other comonomers.

The weight ratio of cross-linking comonomer C is preferably greater than 1%, more preferably greater than 5%, in particular between 10 and 30%.

Various other monomers, such as for example diene monomers such as butadiene, isoprene, piperylene, may possibly be added in a minority proportion, preferably less than 20% of the total weight of monomers.

According to one particularly preferred embodiment of the invention, the monomers A, B and C are different and are all three vinyl monomers, in particular are all three non-aromatic vinyl monomers.

According to another particularly preferred embodiment of the invention, whether combined or not with the previous one, the monomers A and B bear a single function polymerisable by addition, and the cross-linking monomer C bears only two functions which are polymerisable by free-radical polymerisation.

The cross-linked, Z-functionalised VP may be prepared by any synthesis process suitable for functionalisation of a vinyl copolymer.

Preferably, this synthesis is carried out by free-radical polymerisation of the different monomers. The general principle of such a technique is known, and has been applied in particular to the free-radical polymerisation in emulsion of Z-functionalised polystyrene (alkoxysilane or hydroxysilane) in the presence of TSPM (see for example *Macromolecules* 2001, 34, 5737 and *Macromolecules* 2002, 35, 6185), or to the synthesis of polystyrene which is cross-linked (but not functionalised) in the presence of DVB (*Polymer* 2000, 41, 481).

Preferably, for the synthesis described above, the non-aromatic vinyl monomer A is an acrylate or methacrylate monomer; the functionalising comonomer B (bearing the function Z) is preferably selected from the group consisting of TSPM, TSPA, TSES and mixes of these monomers; the cross-linking comonomer C is itself a vinyl compound, preferably selected from the group consisting of HGDMA, PGDMA, EGDMA, DVB and mixes of these monomers.

There may thus be obtained nanoparticles of Z-functionalised, cross-linked VP, in emulsion in water, that is to say in the form of a latex (typically, for example, 100 g of polymer per liter of water). It will be recalled that polymer "latex" must be understood in known manner to mean a colloid system composed of a suspension or an emulsion of polymer particles in an aqueous medium.

As shown in FIG. 1, these VP nanoparticles characterised by TEM in accordance with section I-1-A above are preferably present in a substantially spherical form (therefore in the form of nanobeads), either in the isolated state or in the form of aggregates which themselves may possibly be agglomerated. The number of nanoparticles per aggregate is typically between 2 and 100.

The average diameter of these nanobeads, which can be measured for example by TEM as indicated in section I-1-A, is preferably between 10 and 100 nm, more preferably between 10 and 60 nm, in particular between 10 and 40 nm.

The VP nanoparticles according to the invention previously described are advantageously usable for reinforcing polymeric matrices, the polymer of these matrices possibly being of any nature, for example a thermoplastic material, a thermohardening material, or a diene or non-diene elastomer.

In these polymeric matrices, the amount of VP nanoparticles is preferably of between 10 and 100 parts by weight per hundred parts of polymer. Owing to the low density of these nanoparticles, this amount is advantageously between 10 and 80 parts, preferably between 20 and 50 phr and even more preferably strictly greater than 30 phr.

Preferably, the VP filler furthermore constitutes more than 80%, more preferably more than 90% (% by volume) of the entire reinforcing filler, a minority fraction (preferably less than 20%, more preferably less than 10% by volume) of this entire filler possibly being constituted by another reinforcing filler, for example an inorganic filler or carbon black.

The VP nanoparticles may advantageously constitute the entire reinforcing filler in said polymeric matrices.

II-2. Masterbatch of VP Nanoparticles

The VP nanoparticles previously described are advantageously incorporated into their polymer matrix by means of a masterbatch, that is to say that these particles are mixed beforehand with at least one polymer to facilitate their later incorporation into the final polymeric matrix.

"Masterbatch" should be understood in known manner to mean the mix of at least one polymer (for example an elastomer or a mix of elastomers) and a reinforcing filler, the precursor mix of the final polymer matrix, ready for use.

By way of example, this masterbatch may be prepared by a process comprising the following steps:
 starting from a latex of the polymer and a latex of the functionalised, cross-linked VP;
 mixing them thoroughly;
 precipitating the mix thus obtained;
 then washing and drying the precipitate thus obtained.

The polymer latex may consist of a polymer already available in emulsion or for example a polymer initially in solution which is emulsified in a mix of organic solvent and water, generally by means of a surfactant (the organic solvent being eliminated at the moment of coagulation or precipitation).

The operation of thoroughly mixing the two latexes is performed so as to disperse the VP nanoparticles properly in the polymer, homogenise the entire mix to form a latex mix of concentration of solid matter preferably of between 20 and 500 g/l, more preferably between 50 and 350 g/l. Preferably, the two starting latexes are diluted in water before mixing (for example 1 volume of water to 1 volume of latex).

The mix of the two latexes may be precipitated by any process known to the person skilled in the art, for example by mechanical action or preferably by action of a coagulating agent. The coagulating agent is any liquid compound, water-miscible but a non-solvent (or poor solvent) of the polymer, for example an aqueous saline solution, preferably an alcohol or a mix of solvents comprising at least one alcohol (for example alcohol and water, alcohol and toluene). More preferably, the coagulating agent is a single alcohol such as methanol or isopropanol. The coagulation is carried out preferably with stirring, at ambient temperature, in a large volume of coagulating agent; typically, substantially a volume of alcohol at least twice the total combined volume of the two diluted latexes is used. During this step, it is preferred to pour the mix of the two latexes on to the coagulating agent, and not vice versa.

After washing and drying, the masterbatch is obtained in the form of polymer "crumbs", comprising at least the selected polymer and the VP nanoparticles embedded in the polymer matrix.

Various additives may possibly be incorporated in the masterbatch, whether they be intended for the masterbatch proper (for example a stabilising agent, carbon black as colouring and anti-UV agent, a plasticiser, an antioxidant, etc.) or for the final polymer matrix for which the masterbatch is intended.

The polymer of the masterbatch may be any polymer, whether identical or not to the one (or ones) of the final polymer matrix. It may be advantageous to use the same polymer and to adjust the amount of VP in the masterbatch to the intended final amount, so as not to have to add polymer later, during the manufacture of the final polymeric composition comprising the nanoparticles of the invention, as reinforcing filler, and the polymer thus reinforced.

3. Use of the VP Nanoparticles as a Tyre Reinforcing Filler

The nanoparticles according to the invention previously described are preferably used for reinforcing tyres or semi-finished products for tyres, these semi-finished products being in particular selected from the group consisting of treads, underlayers intended for example to be placed beneath these treads, crown reinforcement plies, sidewalls, carcass reinforcement plies, beads, protectors, inner tubes, airtight internal rubbers for tubeless tyres, internal sidewall reinforcement rubbers and other rubbers intended for bearing the load in the event of travelling on a flat tyre.

For the manufacture of such semi-finished products, rubber compositions are used which are based on at least: (i) a (that is to say at least one) diene elastomer; (ii) a (that is to say at least one) VP filler according to the invention and (iii) a (that is to say at least one) coupling agent providing the bond between this VP filler and this diene elastomer.

The expression "based on" is to be understood to mean a composition comprising the mix and/or the product of reaction of the different base constituents used, some of these constituents being able to react and/or being intended to react together, at least in part, during the different phases of manufacture of the composition, or during the later curing thereof.

Elastomer or rubber (the two terms being synonymous) of "diene" type is understood in known manner to mean an elastomer resulting at least in part (i.e. a homopolymer or a copolymer) from diene monomers (monomers bearing two double carbon-carbon bonds, whether conjugated or not). The diene elastomer is preferably selected from the group of highly unsaturated diene elastomers which consists of polybutadienes (abbreviated to BR), polyisoprenes (IR), natural rubber (NR), butadiene copolymers, isoprene copolymers and mixes of these elastomers.

According to one particular embodiment, the diene elastomer is majoritarily, that is to say to more than 50 phr, a styrene/butadiene copolymer (SBR), be it an SBR prepared in emulsion ("E-SBR") or an SBR prepared in solution ("S-SBR"), or an SBR/BR, SBR/NR (or SBR/IR), or alternatively BR/NR (or BR/IR) blend (mix).

According to another particular embodiment, the diene elastomer is majoritarily (to more than 50 phr) an isoprene elastomer, that is to say an isoprene homopolymer or copolymer selected from the group consisting of natural rubber (NR), synthetic polyisoprenes (IR), the various isoprene copolymers and mixes of these elastomers. This isoprene elastomer is preferably natural rubber, or a synthetic cis-1,4 polyisoprene having an amount of cis-1,4 bonds greater than 90%, more preferably still greater than 98% (mole %).

According to another particular embodiment, in particular when the VP filler is intended to reinforce a tyre sidewall, an airtight internal rubber of a tubeless tyre (or other element impermeable to air), the rubber composition may contain at least one essentially saturated diene elastomer, in particular at least one EPDM copolymer or a butyl rubber (possibly chlorine or brominated), whether these copolymers be used alone or in a mix with highly unsaturated diene elastomers such as mentioned previously, in particular NR or IR, BR or SBR.

The coupling agent (or bonding agent) is intended to establish a sufficient connection between the surface of the VP particles and the polymer for which these particles are intended, so that the latter may fully perform their function of reinforcing filler.

Coupling agents are well-known to the person skilled in the art and have been described in a very large number of documents. Any coupling agent capable of ensuring, in a diene rubber composition usable for the manufacture of tyres, the effective bonding between a reinforcing inorganic filler such as a silica and a diene elastomer, in particular polyfunctional organosilanes or polyorganosiloxanes, may be used.

By way of examples of organosilanes, mention may be made of bis-(($C_1$-$C_4$) alkoxysilyl-($C_1$-$C_4$)) alkyl polysulphides, such as, for example bis(3-trimethoxysilylpropyl) or bis(3-triethoxysilylpropyl) polysulphides, in particular bis(3-triethoxysilylpropyl) tetrasulphide, abbreviated to TESPT, of formula $[(C_2H_5O)_3Si(CH_2)_3S_2]_2$ or bis-(triethoxysilylpropyl) disulphide, abbreviated to TESPD, of formula $[(C_2H_5O)_3Si(CH_2)_3S]_2$. Mention will also be made, as examples of advantageous coupling agents, of the polysulphides of bis-(mono($C_1$-$C_4$) alkoxyl-di($C_1$-$C_4$) alkylsilylpropyl), more particularly bis-monoethoxydimethylsilylpropyl tetrasulphide or disulphide. By way of examples of coupling agents other than the aforementioned polysulphurised alkoxysilanes, mention will be made in particular of bifunctional polyorganosiloxanes or alternatively hydroxysilane polysulphides.

The amount of coupling agent is preferably less than 10 phr, more preferably less than 7 phr, in particular less than 5 phr.

Of course, the above rubber compositions also comprise all or some of the conventional additives usually used in elastomer compositions intended for the manufacture of tyres, such as, for example, plasticisers or extender oils, pigments, protective agents such as anti-ozone waxes, chemical antiozonants, antioxidants, anti-fatigue agents, reinforcing or plasticising resins, methylene acceptors or donors, coupling activators, covering agents, agents facilitating processability, a cross-linking system based either on sulphur or on sulphur and/or peroxide and/or bismaleimide donors, vulcanisation accelerators or vulcanisation activators.

EXAMPLES OF EMBODIMENT

1. Test 1

In the examples of embodiment which follow, two fillers of (Z-)functionalised, cross-linked polymethacrylate are synthesised by free-radical polymerisation of three different monomers—methyl methacrylate (MMA), ethylene glycol dimethacrylate (EGDMA) and filler A: trimethoxysilylpropyl methacrylate (TSPM) or filler B: trimethoxysilylpropyl acrylate (TSPA)—then incorporated in a rubber composition for a tyre in the form of masterbatches obtained by coprecipitation of a latex of the VP filler and a latex of a diene elastomer (SBR).

According to one particularly preferred embodiment, the weight ratio of comonomer B bearing the Z function (here, TSPM or TSPA) is of between 20 and 30%, and that of the cross-linking comonomer C (here, EGDMA) is of between 10% and 30%.

A. Synthesis of the Polymethacrylate Nanoparticles:

The different monomers are subjected beforehand to nitrogen bubbling, as are all the aqueous solutions used with the exception of the solution of SDS (bubbling in powder state). The reaction is carried out in a 1.5 l reactor equipped with a mechanical stirring means. After introduction of 840 ml water and 30 minutes' nitrogen bubbling with stirring, there are introduced in succession 50 ml of a 0.9 mol/l aqueous solution of sodium dodecyl sulphate (SDS) as surfactant, 50 ml of a 1 mol/l equimolar buffer solution of sodium hydrogen phosphate and of ammonium dihydrogen phosphate. To this solution buffered at pH 7, stirred at 350 rpm and heated to 60° C. there is added the monomer filler in the following order:

Filler A: 48.7 g of MMA (or a weight fraction of 47.1%), 29.1 g of EGDMA (weight fraction of 28.1%) then 25.6 g of TSPM (weight fraction of 24.8%).

Filler B: 48.7 g of MMA (or a weight fraction of 47.8%), 29.1 g of EGDMA (weight fraction of 28.6%) then 24.1 g of TSPA (Weight fraction of 23.7%).

With vigorous stirring (350 rpm) there is then added to the resulting emulsion 45 ml of an aqueous solution of potassium persulphate (0.125 mol/l). After 60 min at 60° C. with stirring, 18 ml of an aqueous hydroquinone solution (0.5 mol/l) is added to the polymerisation medium. The reaction medium is cooled before mixing with the elastomer (conversion rate, measured by dry extract: filler A of 99%; filler B: 94%).

The functionalised, cross-linked polymethacrylates thus obtained are in the form of a latex comprising approximately 10% by weight of solid (VP) and water to make up (approximately 90%).

The filler A latex is characterised in accordance with section I-1-A. The TEM image given in FIG. 1 shows that the nanoparticles (elementary particles) of the invention here are in the form of nanobeads, the majority of which have a diameter of between 20 and 60 nm. The average circular diameter is equal to 34 nm (standard deviation 6 nm).

At this stage, the polymethacrylate (filler A) is isolated and dried to evaluate the amount of (Z-)functionalisation thereof provided by the monomer TSPM, by analysis of the amount of silicon, by proceeding as follows:
- a first step of solubilisation of the sample in aqueous medium by calcination then by alkaline fusion of the ashes obtained;
- a second step of quantitative analysis of the silicon by inductively-coupled plasma atomic emission spectrometry (ICP/AES).

More precisely, operation is as follows: the sample is calcined at 525° C. for 2 hours. The fusion is then carried out on the ash obtained, at 1150° C. (±50° C.) with lithium tetraborate (for example 2 g per 1 g of calcined filler), for approximately 25 min. After cooling, the entire fused bead obtained is solubilised at 80° C. in hydrochloric acid diluted to 2% in water. The solution is then transferred and adjusted in a volumetric flask.

The analysis of the silicon is then carried out, on the contents of the volumetric flask, by ICP/AES: the aqueous solution is delivered into an argon plasma via an introduction system, where it undergoes the phases of desolvation, atomisation then excitation/ionisation of the atoms present. The emission line of the silicon at 251.611 nm is then selected by means of a monochromator, then quantified relative to a calibration curve prepared from a certified standard solution of the corresponding element (the intensity I of the line emitted being proportional to the concentration C of the corresponding element).

The result is expressed in mass % of silicon relative to the dry sample (dried beforehand at 105° C. for 2 hours), in accordance with the formula:

$$\% \ Si = C \cdot V \cdot (100/M)$$

in which:
C=concentration of Si expressed in mg/l;
V=volume of the volumetric flask in l;
M=weight of the sample in mg.

The amount of silicon thus measured is equal to 2.6% (±0.2%), therefore virtually equal to the theoretical amount (namely 2.8%).

The density of the filler A nanoparticles is measured on the powder, using a helium pycnometer: the value obtained is equal to 1.25 g/cm³.

B. Preparation of the Masterbatch:

The polymethacrylate latices are then incorporated directly into an SBR diene elastomer to obtain a masterbatch as indicated in section II-2 above. The amount of polymethacrylate filler intended in the masterbatch, as in the intended final rubber composition, is 39 phr (parts by weight per hundred parts of elastomer).

The SBR latex is prepared in a manner known to the person skilled in the art, under the following conditions: polymerisation temperature: 5° C.; surfactant: sodium dodecyl sulphate; initiator: iron II salt/hydroperoxide redox system. The conversion is of the order of 50 to 60%. The SBR thus produced has the following characteristics: inherent viscosity at 0.1 g/dl in toluene at 25° C.: 3.11; Mooney viscosity (MS) equal to 67; Tg (DSC)=−52° C.; microstructure: styrene 23.6%, butadiene phase: vinyl 15.0%, trans 70.1%, cis 14.9%.

The quantity of dry matter of the SBR latex is determined by weighing, on a dry extract, before preparing the masterbatch. The SBR latex is diluted to 3 times its volume in water, namely:

Filler A: 652 ml of SBR latex at 177.1 g/l (115.4 g of SBR) and 1304 ml of dilution water.

Filler B: 408 ml of SBR latex at 195.9 g/l (80 g of SBR) and 820 ml of dilution water.

Once the syntheses are complete, the polymethacrylate filler latices are cooled to room temperature and then added to the SBR latices diluted to a proportion of 39 phr of filler, i.e.:

Filler A: 497 ml of polymethacrylate filler latex at 90.5 g/l (45 g of filler),

Filler B: 368 ml of polymethacrylate filler latex at 84.8 g/l (31.2 g of filler).

The resulting mix is homogenised gently. At a rate of 100 ml/minute, the mix is then added to filler A: 5000 ml; filler B: 3500 ml of methanol stirred at 350 rpm. The precipitate thus obtained is filtered off on filter paper, rinsed with water until there is constant slight residual foaming in the washing water and the washing water tests negative with silver nitrate. The precipitate thus washed is dried under reduced pressure under nitrogen at 60° C. for 3 to 4 days. 156 g (filler A) and 107.7 g (filler B) of dry masterbatch are thus recovered.

C. Preparation of the Rubber Compositions:

A control composition (HD silica filler) is prepared in conventional manner, as follows: first of all ("non-productive phase") the SBR elastomer extended beforehand with 37.5 phr of oil and part of the filler are introduced into an internal mixer, the initial tank temperature of which is approximately 90° C. After an appropriate kneading time, of the order of 1 minute, the coupling agent and the remaining part of the filler are added. The other ingredients, with the exception of the vulcanisation system, are added after 2 minutes. The internal mixer is then filled to 75%. Thermomechanical working of a duration of about 6 minutes is then performed, with an average blade speed of 70 rpm, until a dropping temperature of about 135° C. is obtained.

The procedure is identical for a second and third composition, this time incorporating the VP filler (polymethacrylate) according to the invention, except that the VP filler and the diene elastomer are introduced in a single go from the start, in the form of the masterbatch previously prepared comprising 39 phr of VP particles; then the extender oil (37.5 phr of TDAE oil) is incorporated gradually.

After the thermomechanical kneading work, the mix obtained is recovered and cooled, then the vulcanisation system (sulphur and sulphenamide-type primary accelerator) is added on an external mixer at 30° C., by mixing everything ("productive phase") for an appropriate time (between 5 and 12 min).

The compositions thus obtained are then either calendered in the form of plates (thickness of 2 to 3 mm) of rubber in order to measure their mechanical properties, or extruded in the form of a semi-finished product for tyres, for example a tread. Vulcanisation (curing) is carried out at 150° C. for 40 min, under pressure.

D. Characterisation of the Rubber Compositions:

The rubber compositions are characterised, before and after curing, as indicated below.

Tensile Tests:

These tests make it possible to determine the elasticity stresses and the properties at break after curing. Unless indicated otherwise, they are effected in accordance with French Standard NF T 46-002 of September 1988. The true secant moduli (i.e. calculated reduced to the real section of the test piece), expressed in MPa, at 100% elongation (moduli marked M100), 300% elongation (M300) and 400% elongation (M400), are measured in a first elongation (i.e. without an accommodation cycle). All these tensile measurements are effected under normal conditions of temperature and humidity (23±2° C.; 50±5% relative humidity).

Rheometry:

The measurements are effected at 150° C. with an oscillating-chamber rheometer, in accordance with DIN Standard 53529—part 3 (June 1983). The evolution of the rheometric torque as a function of time describes the evolution of the stiffening of the composition following the vulcanisation reaction. The measurements are processed in accordance with DIN Standard 53529—part 2 (March 1983). The conversion rate constant K (in $\min^{-1}$) of order 1, calculated between 30% and 80% conversion, is measured, which makes it possible to assess the vulcanisation kinetics (the higher K is, the faster are the kinetics).

Dynamic Properties:

The dynamic properties $\Delta G^*$ and $\tan(\delta)_{max}$ are measured on a viscoanalyser (Metravib VA4000), in accordance with ASTM Standard D 5992-96. The response of a sample of vulcanised composition (cylindrical test piece of a thickness of 2 mm and a section of 79 mm$^2$), subjected to an alternating single sinusoidal shearing stress, at a frequency of 10 Hz, under normal conditions of temperature (23° C.) in accordance with Standard ASTM D 1349-99, is recorded. Scanning is effected at an amplitude of peak-to-peak deformation of 0.1 to 50% (outward cycle), then of 50% to 0.1% (return cycle). The results used are the complex dynamic shear modulus ($G^*$) and the loss factor tan $\delta$. For the return cycle, the maximum value of tan $\delta$ which is observed is indicated ($\tan(\delta)_{max}$), as is the deviation in the complex modulus ($\Delta G^*$) between the values at 0.1 and 50% deformation (Payne effect).

E. Results of the comparative rubber properties tests:

The aim of the test is to compare the performance OF THE nanoparticles of the invention with that of the conventional inorganic filler (HD silica).

For this, the three compositions prepared in accordance with section C above, the general formulation of which is conventional for high-performance tyre treads, combining low rolling resistance and high wear resistance (passenger-vehicle tyres of low energy consumption known as "Green Tyres"), are compared. The HD silica selected to reinforce the control composition is a tyre-grade silica having in known manner a very high reinforcing ability ("Zeosil" type "1165 MP" from Rhodia—density approximately 2.1 g/cm$^3$).

For the control composition, the diene elastomer used is the SBR the synthesis of which is described in section 111-2, extended beforehand with 37.5% of TDAE oil (namely 37.5 phr of oil per 100 phr of dry SBR).

The three compositions tested are strictly identical except for the nature of the reinforcing filler:
- composition C-1: HD silica (control);
- composition C-2: TSPM-functionalised VP (invention);
- composition C-3: Z-functionalized VP (TSPA).

The amount of reinforcing filler was adjusted to equal volume fractions of filler (same volume—namely approximately 19%—of filler in each composition). The specific surface area of the polymer filler being lesser, the quantity of TESPT coupling agent introduced into the compositions C-2 and C-3 is therefore lower.

In compositions C-2 and C-3 (invention), the VP nanoparticles represent approximately 97% (by volume) of the entire reinforcing filler, the latter comprising a small proportion (2 phr) of carbon black.

Tables 1 and 2 show in succession the formulation of the different compositions (Table 1—amount of the different products expressed in phr), and their properties before and after curing at 150° C. for 40 minutes (Table 2).

Examination of the various results of Table 2 shows, for the compositions C-2 and C-3 reinforced with the nanoparticles according to the invention, compared with the control composition C-1:

- in the uncured state, improved vulcanisation kinetics (constant K);
- a very significant reduction in the density (measured using a helium pycnometer), of approximately 16% relative to the control composition (difference of course maintained after curing);
- after curing, equivalent values of modulus at high deformation (M100, M300, M400), which is a clear indicator to the person skilled in the art of a high level of reinforcement, equivalent to that provided by the reference HD silica;
- last but not least, hysteresis properties which, unexpectedly, are very substantially improved, as illustrated by a great reduction in the values of $\tan(\delta)_{max}$ and of $\Delta G^*$, which is a recognised indicator of reduced rolling resistance and heating.

2. Test 2

In the production example that follows, the functionalised (Z) and crosslinked polymethacrylate filler synthesised in paragraph III-1-A (filler B) by radical polymerisation of three different monomers—methyl methacrylate (MMA), ethylene glycol dimethacrylate (EGDMA) and trimethoxysilylpropyl acrylate (TSPA)—is incorporated into a tyre rubber composition in the form of a masterbatch obtained by coprecipitation of the VP filler latex and of an NR latex.

A. Preparation of the Masterbatch

The polymethacrylate latex is incorporated directly into natural rubber. The polymethacrylate filler content targeted in the masterbatch is 39 phr (parts by weight per hundred parts of elastomer).

The amount of NR latex dry matter is determined by weighing, on the dry extract, before preparing the masterbatch. The NR latex is diluted threefold with water, i.e. 447 ml of NR latex at 178.8 g/l (80 g of NR) and 900 ml of dilution water.

Once its synthesis is complete, the polymethacrylate filler latex (Filler B synthesised in paragraph III-1-A) is cooled to room temperature and then added to the NR latex diluted to a rate of 39 phr of filler, i.e. 368 ml of polymethacrylate filler latex at 84.8 g/l (31.2 g of filler). The resulting mix is homogenised gently. At a rate of 100 ml/minute, the mix is then added to 3500 ml of methanol stirred at 350 rpm. The precipitate thus obtained is filtered through filter paper, rinsed with water until there is constant slight residual foaming in the washing water and the washing water tests negative with silver nitrate. The precipitate thus washed is dried under reduced pressure under nitrogen at 60° C. for 3 to 4 days. 110 g of dry masterbatch are thus recovered.

B. Rubber Properties Tests

Two compositions of NR rubber are then prepared as indicated previously for Test 1 (dropping temperature of about 145° C.), these two compositions differing only in the nature of their reinforcing filler, as follows:
  composition C-4 (control): HD silica;
  composition C-5 (invention): TSPA-functionalised VP.

As preferential application examples, such rubber compositions are typically used in the parts of road contact systems, especially of tyres, usually using NR-based rubber matrices, for instance the inner safety bearings of tyres, the sidewalls, the bead zones of tyres, the underlayers of treads and also the treads of these tyres, especially for heavy-goods vehicles.

The content of reinforcing filler was adjusted to equal volume fractions of filler (same volume—i.e. about 17%—of filler in each composition). Since the specific surface area of the polymer filler is lower, the amount of TESPT coupling agent introduced into composition C-5 is thus markedly lower. In composition C-5 of the invention, the VP filler represents about 97% (by volume) of the total amount of reinforcing filler, the latter comprising a small proportion (1 phr) of carbon black.

Tables 3 and 4 show in succession the formulation of the different compositions (Table 3—amount of the different products expressed in phr), and their properties before and after curing at 150° C. for 25 minutes (Table 4).

Examination of the various results of Table 4 shows, for composition C-5 according to the invention, compared with the control composition C-4:
  in the uncured state, similar scorching safety (Ti) and vulcanisation kinetics (constant K);
  a very significant reduction in the density (approximately −14%);
  after curing, higher values of modulus at very high deformation (see the values for M600), which shows a high level of reinforcement afforded by the VP filler, which is at least equivalent if not superior to that afforded by the reference HD silica;
  last but not least, which largely goes to confirm all the preceding results observed with a synthetic diene elastomer (SBR), hysteresis properties that are once again greatly improved (very substantially reduced values of $(\tan(\delta)_{max}$ and of $\Delta G^*)$).

In conclusion, the VP nanoparticles according to the invention, owing to their very greatly reduced density compared with a conventional reinforcing filler such as carbon black or HD silica, make it possible to reduce very significantly the weight of the polymeric compositions.

This aim is achieved not only without degradation of the reinforcement, which is synonymous with wear resistance or resistance to cracking, compared with these conventional fillers, but also by permitting a significant reduction in hysteresis, which is synonymous with rolling resistance or heating which are improved still further compared with a conventional reinforcing inorganic filler such as an HD silica.

Finally, one notable advantage of the VP filler must be emphasised: since the density of the polymeric matrix becomes substantially equal to that of the VP filler itself, it thus becomes possible to increase the amount of reinforcing filler without increasing the density of said polymeric matrix.

The nanoparticles of the invention are advantageously usable as reinforcing filler for any type of polymeric matrix, whether the polymers be in particular thermoplastic, thermohardening, or alternatively elastomers (by way of examples polyamides, polyesters, polyolefins such as polypropylene, polyethylene, PVC, polycarbonates, polyacrylics, epoxy resins, polysiloxanes, polyurethanes or diene elastomers).

TABLE 1

| | Composition No. | | |
|---|---|---|---|
| | C-1 | C-2 | C-3 |
| SBR (1) | 100 | 100 | 100 |
| HD silica (2) | 77 | — | — |
| VP filler (3) | — | 39 | — |
| VP filler (8) | — | — | 39 |
| coupling agent (4) | 6.2 | 1.8 | 1.8 |
| carbon black (N234) | 2 | 2 | 2 |
| oil (5) | 37.5 | 37.5 | 37.5 |
| ZnO | 2.5 | 2.5 | 2.5 |
| stearic acid | 2 | 2 | 2 |
| antioxidant (6) | 1.9 | 1.9 | 1.9 |
| sulphur | 1.5 | 1.5 | 1.5 |
| accelerator (7) | 2.5 | 2.5 | 2.5 |

(1) SBR elastomer (synthesis described in section III-B);
(2) HD silica ("Zeosil" type "1165MP" from Rhodia);
(3) Z-functionalised VP (synthesised as in section III-A: filler A);
(4) TESPT ("Si69" from Degussa);
(5) TDAE extender oil ("Vivatec 500" from Klaus Dahleke);
(6) N-1,3-dimethylbutyl-N-phenylparaphenylenediamine ("Santoflex 6-PPD" from Flexsys);
(7) N-cyclohexyl-2-benzothiazylsulphenamide ("Santocure CBS" from Flexsys);
(8) Z-functionalised VP (synthesised as in section III-A: Filler B).

TABLE 2

| | Composition No. | | |
|---|---|---|---|
| | C-1 | C-2 | C-3 |
| Properties before curing: | | | |
| K (min$^{-1}$) | 0.105 | 0.151 | 0.217 |
| density (g/cm$^3$) | 1.19 | 1.01 | 1.02 |
| Properties after curing: | | | |
| M100 (MPa) | 3.5 | 3.5 | 4.8 |
| M300 (MPa) | 11.1 | 10.6 | 13.3 |
| M400 (MPa) | 17.0 | 17.0 | 18.8 |
| $\Delta G^*$ | 5.6 | 0.8 | 1.2 |
| $\tan(\delta)_{max}$ | 0.300 | 0.185 | 0.187 |

TABLE 3

| | Composition No. | |
|---|---|---|
| | C-4 | C-5 |
| NR (1) | 100 | 100 |
| HD silica (2) | 50 | — |
| VP filler (3) | — | 25.7 |
| carbon black (N234) | 1 | 1 |
| coupling agent (4) | 4 | 1.16 |
| ZnO | 3 | 3 |
| stearic acid | 2.5 | 2.5 |
| antioxidant (5) | 1.5 | 1.5 |
| sulphur | 1.5 | 1.5 |
| accelerator (6) | 1.8 | 1.8 |

(1) natural rubber;
(2) HD silica ("Zeosil" type "1165MP" from Rhodia);
(3) TSPA-functionalised NAVP (synthesised according to paragraph III-1-A, filler B);
(4) TESPT ("Si69" from Degussa);
(5) N-1,3-dimethylbutyl-N-phenylparaphenylenediamine ("Santoflex 6-PPD" from Flexsys);
(6) N-cyclohexyl-2-benzothiazylsulphenamide ("Santocure CBS" from Flexsys).

TABLE 4

|  | Composition No. | |
| --- | --- | --- |
|  | C-4 | C-5 |
| Properties before curing: | | |
| K (min$^{-1}$) | 0.327 | 0.307 |
| density (g/cm$^3$) | 1.16 | 1.00 |
| Properties after curing: | | |
| M100 (MPa) | 3.9 | 4.8 |
| M300 (MPa) | 13.2 | 13.0 |
| M400 (MPa) | 19.1 | 19.9 |
| M600 (MPa) | 25.8 | 28.8 |
| ΔG* | 2.51 | 1.31 |
| tan(δ)$_{max}$ | 0.199 | 0.144 |

The invention claimed is:

1. A method for reinforcing a polymeric matrix, comprising:
incorporating into the polymeric matrix reinforcing particles comprising:
nanoparticles of functionalised, cross-linked vinyl polymer, usable as reinforcing filler in a polymeric matrix, wherein said vinyl polymer is a copolymer of at least the following monomers, which are all copolymerisable by free-radial polymerisation:
a non-aromatic vinyl monomer "A";
a monomer "B" bearing a function Z of formula =Si—X, X representing a hydroxyl or hydrolysable group; and
a cross-linking monomer "C", which is at least bifunctional from the point of view of said polymerisation;
and wherein the polymer of the polymeric matrix comprises an elastomer.

2. The method according to claim 1, wherein the polymeric matrix forms part of a tire.

3. The method according to claim 1, wherein said incorporating comprises:
combining the nanoparticles with a polymer latex to form a latex mixture wherein the nanoparticles are dispersed in the polymer latex;
precipitating the latex mixture to form a precipitate;
washing and drying the precipitate to form a masterbatch comprising said nanoparticles embedded in a matrix of said polymer.

4. A masterbatch comprising nanoparticles embedded in a polymeric matrix prepared by the method of claim 3.

5. The method according to claim 3, wherein the polymer latex comprises an emulsion of polymer in a solvent mixture comprising an organic solvent and water and a surfactant, and wherein said precipitating comprises removing said organic solvent.

6. The method according to claim 3, wherein said precipitating comprises mechanical action precipitation.

7. The method according to claim 3, wherein said precipitating comprises adding a coagulating agent to the latex mixture.

8. The method according to claim 3, wherein the latex mixture is homogenized and has a concentration of solid matter between 20 and 500 g/l.

9. The method according to claim 3, further comprising adding to the masterbatch one or more additives selected from the group consisting of a stabilizing agent, a coloring agent, an anti-UV agent, a plasticizer, and an antioxidant.

10. The method according to claim 3, further comprising:
combining said masterbatch with an extender oil and a coupling agent to form an extended mixture and thermomechanically kneading the extended mixture to form a kneaded mixture;
cooling the kneaded mixture;
mixing the cooled kneaded mixture with a vulcanization system and curing to form a finished or semi-finished reinforced polymer product.

11. A polymeric composition comprising:
a polymeric matrix;
nanoparticles of a functionalised, cross-linked vinyl polymer prepared by copolymerizing by free radical polymerisation:
a non-aromatic vinyl monomer "A";
a monomer "B" bearing a function Z of formula =Si—X, X representing a hydroxyl or hydrolysable group; and
a cross-linking monomer "C", which is at least bifunctional from the point of view of said polymerisation;
wherein the polymer of the polymeric matrix comprises an elastomer, and
a coupling agent providing a bond between the polymer and the surface of the nanoparticles.

* * * * *